Dec. 10, 1963   G. F. UDALL   3,113,842
GAS DETECTION APPARATUS
Filed Oct. 20, 1961
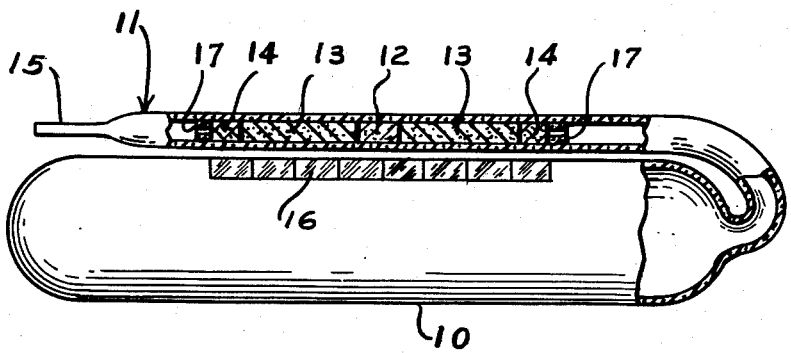
INVENTOR.
GORDON F. UDALL
BY
Clarence R. Patty, Jr.
ATTORNEY

United States Patent Office 3,113,842
Patented Dec. 10, 1963

3,113,842
GAS DETECTION APPARATUS
Gordon F. Udall, Corning, N.Y., assignor to Corning Glass Works, Corning, N.Y., a corporation of New York
Filed Oct. 20, 1961, Ser. No. 146,514
2 Claims. (Cl. 23—254)

This invention relates to apparatus for detecting the presence of particular gases in an atmosphere.

The need for mechanical means for detecting the presence of harmful gases in an atmosphere, for example, the presence of carbon monoxide within the cabin of an airplane, is well known. This need results from the fact that many such gases are not detectable by the human senses, and without special equipment their presence can be ascertained only after their harmful effects have been observed.

One method for detecting the presence of gases depends upon drawing a quantity of the atmosphere to be tested through a transparent container having therein a quantity of a substance which reacts with the gas to be detected and thereby changes in color as the result of such reaction. By observing the degree of change in the color of the indicator one can determine the concentration of the gas in question. The most common type of apparatus for testing by this method comprises a glass tube sealed at each end containing the indicator and a suction bulb for attachment to one end of the tube and adapted to draw gases through the indicator in the tube after the seals at the ends have broken.

Such apparatus, although satisfactory for most uses, is difficult to use by one who is at the same time engaged in another activity, for example, flying an airplane. To use such apparatus it is necessary for a pilot to remove both hands from the controls of the airplane.

It is an object of this invention to provide gas detection apparatus in the form of a single unit which is substantially easier to operate than previous apparatus and which is not subject to the disadvantages of such apparatus.

It is a further object to provide apparatus which is convenient to carry, low in cost, and which requires less skill to operate than previous types.

These and other objects are accomplished by the provision of a gas detection device which comprises an evacuated chamber having at one end a constricted portion which contains a gas-detecting indicator and which has a frangible tip.

Although the invention will be described with reference to apparatus for detecting the presence of carbon monoxide in air, it will be apparent that the invention is equally applicable to the detection of other gases.

One embodiment of the invention is illustrated in the accompanying drawing, which is an elevational view, partly in section, of one form of apparatus for detecting the presence of carbon monoxide.

Referring to the drawing, the apparatus comprises evacuated glass chamber 10 having a constricted portion 11, which contains the indicator 12. Indicator 12 may be any one of numerous substances which react with various gases and thereby change in color. When the device is used for the detection of carbon monoxide, indicator 12 may be a silica-molybdate complex catalyzed by palladium in the form of a stable sulphate, as described in U.S. Patent 2,487,077, which is hereby incorporated by reference into the present disclosure both to show the composition of the indicator and the method by which it is produced and deposited in the tube and to give a comprehensive and detailed account of the manner in which such an indicator may be used. On each side of indicator 12 is a quantity of high density silica gel 13 which serves both to dry the gas being tested and to insure that the indicator is dry. Retaining wads 14 hold this granular material in place.

In constructing the illustrated device, chamber 10 is formed having constricted portion 11. Next, indicator 12, dessicant 13 and retaining wads 14 are placed in the constricted portion, and finally all air is evacuated from the system, and a seal is made at frangible tip 15. For convenience, color chart 16 may be imprinted on chamber 10 for comparison with the final color of indicator 12 to show the approximate carbon monoxide concentration in the atmosphere being tested. Since this change in color depends upon the amount of gas reacted with the indicator 12, it will be apparent that any given color on chart 16 will indicate the amount of carbon monoxide which passed through the indicator. If it is desired to know the percentage of the atmosphere which this amount represents, it will be necessary to have a series of charts for use at different altitudes or to use a multiplication factor, due to the descrease in atmospheric density with increase in altitude.

Since the degree of completeness of the reaction between the gas and indicator 12 is a function of the time during which the two are in contact, the effective diameter of constricted portion 11 may be further regulated by means of rings 17, which decrease the rate of flow of gas through the indicator.

In order to use the present device, all that the operator need do is to break frangible tip 15, thus permitting the atmosphere to be tested to flow through the indicator to fill evacuated chamber 10. The final color of the indicator is then compared with color chart 16. Thus the operator, with a minimum of distraction, can activate the device almost instantaneously with no need to assemble two or more components, as necessitated by previous systems. The device is especially advantageous in the hands of an unskilled operator, since a precise volume of gas is automatically drawn through the indicator with no need for measurement of volume by the operator.

Constricted portion 11 has been bent back along chamber 10 for compactness and to facilitate comparison between the indicator and the color chart. It will be apparent that such a shape, although preferable, is not necessary.

It will be further apparent that, although the illustrated embodiment employing a wide chamber having a constricted portion is desirable from considerations of simplicity and ease of manufacture, the invention is not to be limited by the shape of the chamber. For example, a long chamber of uniform diameter could be utilized having the indicator located at one end and having a frangible tip at that same end. In addition, other means, such as a valve, can be substituted for the frangible tip.

I claim:
1. A device for detecting the presence of a gas in an atmosphere which device comprises two chambers, the first of said chambers being substantially evacuated and the second of said chambers having fixed therein an indicator which changes appearance on contact with said gas, said second chamber being at least partially transparent to permit said indicator to be viewed from outside said device, said second chamber being juxtaposed with said first chamber and communicating therewith at one end of said second chamber to form a U-shaped configuration, said first chamber being provided with, in juxtaposition with said indicator in said second chamber, means for comparing the appearance of said indicator with predetermined standards indicative of the appearance of said indicator after contact with varying amount of said gas, and means for admitting said atmosphere into said second chamber, said indicator being located between said ad- mitting means and said end communicating with said first chamber.

2. A device for detecting the presence of a gas in an atmosphere which device comprises two intercommunicating chambers, the first of said chambers being substantially evacuated and the second of said chambers being elongated and at least partially transparent and having fixed therein an indicator which changes appearance on contact with said gas, said indicator being fixed immovably between two means which constrict the diameter of said second chamber and thereby increase its resistance to the flow of gases therethrough, said second chamber having means for admitting said atmosphere thereinto at its end opposite said first chamber and being juxtaposed with said first chamber in a U-shaped configuration, said first chamber having thereon means for comparing the appearance of said indicator with predetermined standards indicative of the appearance of said indicator after contact with predetermined amounts of said gas.

References Cited in the file of this patent

UNITED STATES PATENTS

| | | |
|---|---|---|
| 1,321,062 | Lamb et al. | Nov. 4, 1919 |
| 1,567,534 | Maude | Dec. 29, 1925 |
| 2,487,077 | Shepherd | Nov. 8, 1949 |
| 2,569,895 | Main-Smith et al. | Oct. 2, 1951 |
| 2,805,132 | Kuhns | Sept. 3, 1957 |

OTHER REFERENCES

Mine Safety Appliances Co., Bulletin BF-1, Scientific Library dated January 20, 1936.